United States Patent [19]

Howells et al.

[11] 3,732,548

[45] May 8, 1973

[54] SWITCHING CENTER FOR A DATA NETWORK

[75] Inventors: George Aneurin Howells, Bishop's Stortford; Elisabeth June Hunt, Harlow, both of England

[73] Assignee: International Standard Electric Corporation, New York, N.Y.

[22] Filed: Aug. 19, 1971

[21] Appl. No.: 17,333

[30] Foreign Application Priority Data

Aug. 20, 1970 Great Britain....................40,097/70

[52] U.S. Cl.............................340/172.5, 179/18 ES

[51] Int. Cl...............................................H04q 11/00

[58] Field of Search..................................340/172.5; 179/18 ES

[56] References Cited

UNITED STATES PATENTS

| | | | |
|---|---|---|---|
| 3,495,220 | 2/1970 | Lawson | 340/172.5 |
| 3,517,123 | 6/1970 | Harr | 340/172.5 X |
| 3,613,089 | 10/1971 | Karp | 340/172.5 |
| 3,629,839 | 12/1971 | Dimmick | 340/172.5 |
| 3,652,804 | 3/1972 | Comella | 179/18 ES |

*Primary Examiner*—Paul J. Henon
*Assistant Examiner*—Sydney R. Chirlin
*Attorney*—C. Cornell Remsen, Jr. et al.

[57] ABSTRACT

A switching center for a data network in which dedicated storage is provided for channels in each direction the channels handling a mixture of circuit switched (end-to-end connections) and packet switched (store and forward) messages. The switching center interconnects with other centers and with local area channels which may or may not have been concentrated.

11 Claims, 10 Drawing Figures

Inventors
GEORGE A. HOWELLS
ELISABETH J. HUNT
By
Menotti J. Lombardi
Attorney

| 16 BITS | 7 BITS | 9 BITS |
|---|---|---|
| FORWARDING ADDRESS ≡ POINTER | CONTROL CONDITIONS | OUTPUT CHARACTERS REGISTER |

FORWARDING ADDRESS - SWITCH STORE DESTINATION ADDRESS FOR INCOMING CHARACTER

1. ADDRESS STATIC FOR CIRCUIT/SWITCH OPERATION
2. ADDRESS INCREMENTED BY ONE CHARACTER POSITION ON TRANSFER OF EACH NON-EMPTY CHARACTER FOR ADB OPERATION

CONTROL CONDITIONS

1. STATUS CHARACTER COUNT — 2 BITS
2. ADDRESS PHASE
3. ADB OR C/S
4. ADB INPUT OR OUTPUT (items 2–4) — 2 BITS 5. ADB OUTPUT CONDITION - DEFINES OUTPUT RATE OR ON DEMAND OPERATION — 2 BITS
6. DATA TRANSFER SUPERVISORY BIT - CLEANING UP OPERATION — 1 BIT

OUTPUT CHARACTER REGISTER

1. HOLDS CHARACTER TO BE OUTPUT ON CHANNEL CORRESPONDING TO INPUT EXCEPT WHEN DATA BLOCKS ARE BEING OUTPUT
2. CAN BE USED FOR COUNT FUNCTION FOR ADB OUTPUT

FIG. 2

Inventors
GEORGE A. HOWELLS
ELISABETH J. HUNT
By Menotti J. Lombardi
Attorney

Inventors
GEORGE A. HOWELLS
ELISABETH J. HUNT
By [signature]
Attorney

Inventors
GEORGE A. HOWELLS
ELISABETH J. HUNT
By [signature]
Attorney

*Inventors*
GEORGE A. HOWELLS
ELISABETH J. HUNT
By [signature]
*Attorney*

Inventors
GEORGE A. HOWELLS
ELISABETH J. HUNT
By [signature]
Attorney

Inventors
GEORGE A. HOWELLS
ELISABETH J. HUNT
By
Attorney

Inventors
GEORGE A. HOWELLS
ELISABETH J. HUNT
By Menotti L. Lombardi
Attorney

Inventors
GEORGE A. HOWELLS
ELISABETH J. HUNT
By
Menotti Lombardi
Attorney

Inventors
GEORGE A. HOWELLS
ELISABETH J. HUNT
By Menotti J. Lombardi
Attorney

SWITCHING CENTER FOR A DATA NETWORK

This invention relates to a switching center for a synchronous digital data network in which the nominal structure is terminal/local exchange/group center/data switching center (DSC) and trunk network to the next DSC. The switching center is intended to work with equal facility in either a circuit switching (end-to-end connection) mode or a packet switching (store-and-forward) mode. The DSC interconnects trunks to and from other DSC's and also local area channels which may or may not have been concentrated at concentrators associated with the DSC.

According to the invention there is provided a switching center for a synchronous digital data network including terminal equipments for a plurality of pairs incoming and outgoing data transmission means respectively, a first storage device having for each terminal equipment a dedicated storage location, a second storage device having storage locations dynamically allocated for the receipt of address characters from an incoming transmission means whereby an address of an outgoing transmission means can be assembled to enable transfer of data characters from an incoming transmission means to a storage location in the first transmission means associated with the addressed outgoing transmission means, each dedicated storage location being divided into at least two portions one of which is used to store an address of a different storage location in which an incoming data character from an incoming terminal equipment is to be stored, the other portion being used to store a data character received from an incoming terminal equipment to which a different storage location is dedicated, and means for sequentially and cyclically connecting the terminal equipments with the first storage device whereby an incoming character may be inserted in the storage location specified by the address held in the location dedicated to the incoming terminal equipment via which the character is received and a character already held in a storage location may be extracted from that location and transferred to an outgoing terminal equipment to which the storage location holding that character is dedicated, said incoming and outgoing terminal equipments being associated with one p' 'r of incoming and outgoing transmission means.

The above and other features of the invention will now be described with reference to the accompanying drawings, in which:

FIG. 2 illustrates the functions of a dedicated switch storage device;

The data switching center (DSC) to be described can include a circuit switching capability at one or more bit rates as applied to a character TDM transmission network and/or means for stacking characters into blocks for transmission at one or more bit rates using the addressed data block technique and means for unstacking for local emission of corresponding incoming blocks. A TDM local area network forms the basis of the design.

The design of the DSC is based on the use of one or more switch stores each of which is separate from the stores of the controlling processors or computers.

Figure 1:
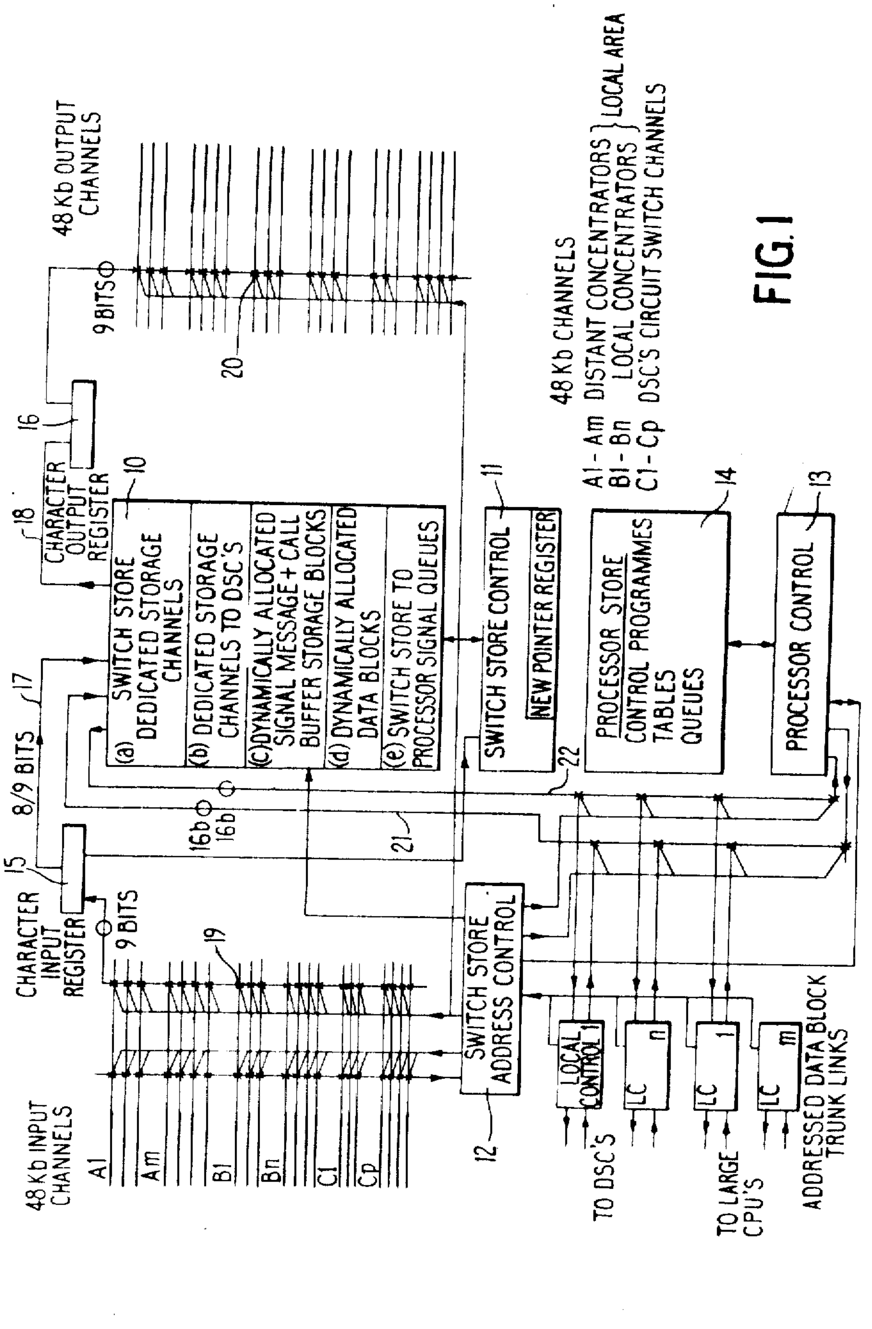
FIG. 1 is a block diagram illustrating the main features of a switching center according to the invention.

The DSC illustrated in FIG. 1 comprises a four-section switch store 10, switch store control 11, switch store address control 12, processor control 13 and processor store 14. The DSC serves a number of input and output channels A*l*–A*m* which connect with distant concentrators. A second set of channels B*l*–B*n* serve local concentrators and a third set of channels C*l*–C*p* circuit switched channels to other DSC's. All these channels may operate typically at 48 Kb or higher rates.

The basic data structure utilized is a 10 bit envelope comprising a character of 8 data bits and 2 system bits. One system bit is a synchronizing, or framing, bit carrying a regular pattern. The other system bit is termed a status bit. In one of its states it identifies the envelope as a user-to-user communication. In its other state the status bit identifies either a network signal or an empty envelope (padding); the distinction between the two being made by the other contents of the envelope (e.g. by the state of another specified bit). This structure secures maximum simplicity of character reception in alphabet No. 5 or in any other eight-unit alphabet. This applies not only to terminal reception but to address reading in a switch, message assembly in a switch or a customer computer processing unit (CPU) etc. It also provides corresponding simplicity of signal recognition.

Data is transferred from the incoming channels to the store 10 via the character input register 15 and from the store to the outgoing channels via the character output register 16 over input and output highways 17, 18. The channels are terminated at switches 19, 20 which connect with the highways 17, 18 under the control of the switch store address control 12.

Similarly the addressed data block trunk links to and from other DSC's or large CPU's are connected through local control terminals LC and input and output highways 21, 22 to store. Again, switching of the trunks to the highways is under the control of the switch store address control 12, which is also connected to the processor control 13. The latter also uses highways 21 and 22 to transfer data to and from the store 10.

The organization of the switch store 10 is illustrated in FIG. 1. The store is subdivided into the following sections:

a. Dedicated Storage for input/output local channels.

b. Dedicated Storage for input/output trunk circuit switched channels.

c. Storage for holding call data and for signal message transmission (16 character blocks), allocated dynamically.

d. Storage for data transmission by the addressed data block method (e.g. 128 character blocks), allocated dynamically.

e. Storage area allocated for queueing signals between processor and switch store.

Each incoming channel and its associated outgoing channel at the DSC has a dedicated 32 bit word in the switch store. As each incoming channel character is scanned the corresponding address of the dedicated word is formed and its contents extracted.

The format of the dedicated word is as indicated in FIG. 2. The first 16 bits are used to address character positions in the switch store. The 17th bit is used to specify one-half character positions. This part of the dedicated word is termed the FORWARD ADDRESS. Its function is to specify where the character incoming on the associated channel is to be placed when a call is in process. It is equivalent to an address POINTER.

The last 9 bits is a store for characters to the output on the corresponding channel. The remaining bits 18 to 24 inclusive are used to staticize control conditions. The reasons for the set of conditions indicated will become evident as the description of the switch proceeds.

Control signals between the terminal and DSC are via signal status characters in each direction. In certain instances conversion to the system envelope format mode may occur in the network at a point between a customer terminal and the DSC.

To enable the switch action to be described a typical set of terminal signal status characters (subsequently referred to as "signal characters") are given in Table 1. Signal characters generated and effective only in the switch are given in Table 2. Abbreviations for the signal characters are given in each case and are used in the switch description. Table 3 provides abbreviations for terminal data characters in a compatible form.

It is clearly important to provide protection against invalid signal characters resulting fr m transmission errors. Two methods have been considered both based on the transmission of repeated characters. In one method a counter is used to define the signal character which is input to the control processor via the signalling queue and to inhibit further transfer. This method guards against $(n\text{-}l)$ spurious characters for the case where the $n^{th}$ character is input but not against an incorrect but valid $n$th signal character. Since such a spurious signal character can be generated at all times by corruption of data and signal characters it is essential to provide protection. An incorrect $n$th character is an extremely rare occurrence for the expected error rate. A parity bit for signal characters provides additional protection. The above method is applied in the switch operations subsequently described.

A method which provides greater security is based on the transfer of the first two signal characters to the control processor. The latter compares the two and takes the specified action if they are identical. If not, it initiates the transfer of two more characters. It may be worthwhile to eliminate the first character and to transfer characters two and three in order to reduce processing load. This method provides a degree of protection for character transmission within the switch. Some extra processing is required in this case.

An alternative means is to use the above counter bits to store the incoming signal character in abbreviated form for comparison with the next signalling character before transfer to the signal queue.

| Character | Abbreviation | Remarks |
|---|---|---|
| Request for Service A | R Q A | Circuit switch to address to be input |
| Request for Service B | R Q B | Circuit switch to an address in control processor |
| Request for Service C | R Q C | Addressed data block to an address to be input |
| Request for Service D | R Q D | Addressed data block to an address in control processor R Q (A+B) = R Q A or R Q B |
| Clear Permanent | C L P | |
| Clear Temporary | C L T | |
| Empty Character | E M P | |
| Send Address | S D A | |
| Stop Sending | S T P | |
| Send Data | S D D | |

TABLE 1 — TERMINAL SIGNAL CHARACTERS

Generated and received by terminals.

| | |
|---|---|
| Address message complete | A M C |
| Data Block full | D B F |
| Data transfer supervisory | D T S |
| Data message complete | D M C |
| Data block empty | D B E |

TABLE 2 — SWITCH SIGNAL CHARACTERS

Generated and effective only in the data switch.

| | | |
|---|---|---|
| Address Digit n | A D n | Address digit other than last |
| Address Digit N | A D N | Last address digit |
| Data character *n* | D C *n* | |
| Data characters *x* N | D C *x* N | Data characters corresponding to the last character in blocks of storage. |

TABLE 3 — TERMINAL DATA CHARACTERS

Figure 3:
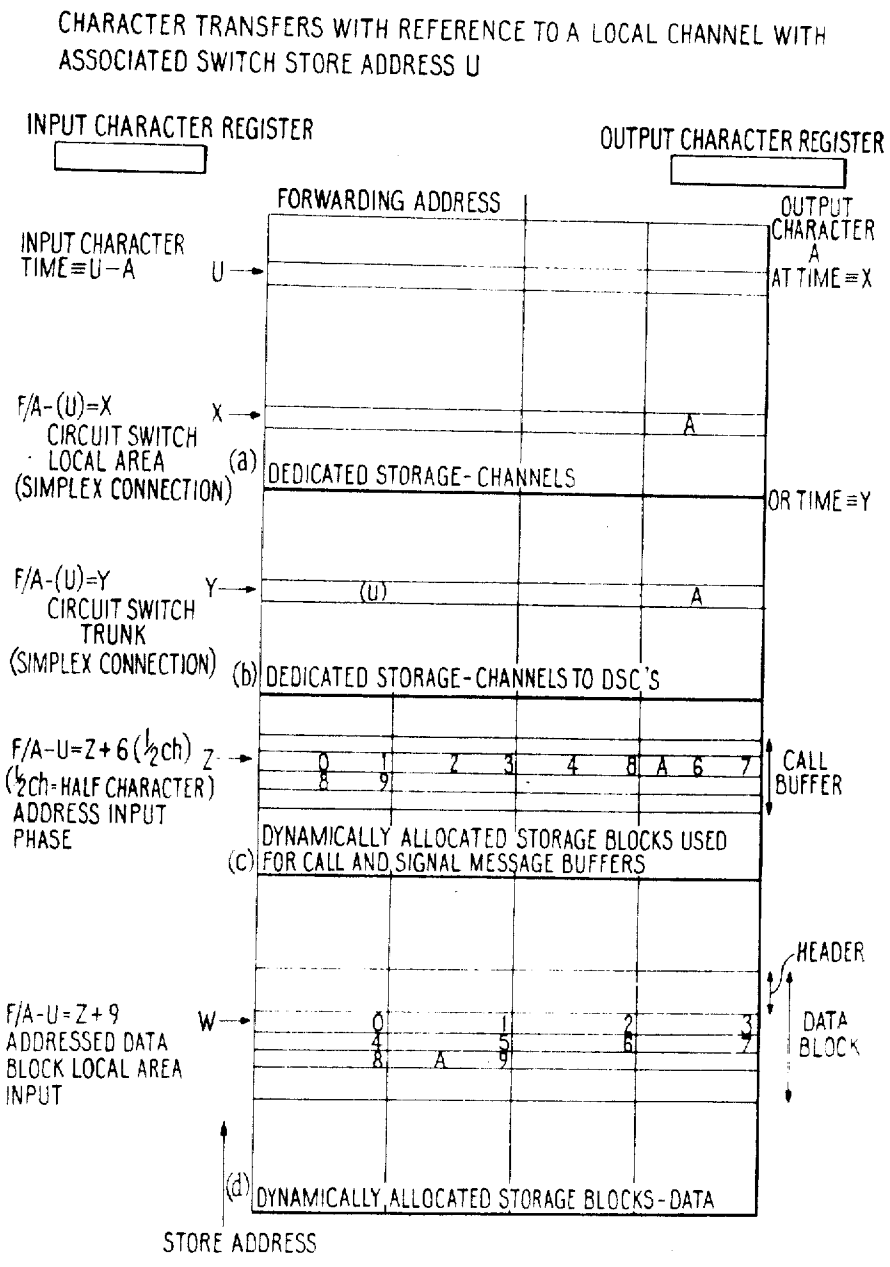
FIG. 3 is a diagram illustrating the transfer alternatives in the store for input data.

The basic character transfer operation of the switch store is illustrated in FIG. 3. Consider incoming flagged characters on channel U which has an associated word in store addressed by U. The content of the forwarding address part of the dedicated word specifies where the incoming flagged character is to be placed. There are four cases illustrated in FIG. 3 as follows:

a. Circuit Switch Local Area

The forwarding address in this case is X which is in the address set associated with channels to concentrators. The result is that the input flagged character A is transferred to the output character position of X to be output when X is subsequently accessed. The forwarding address remains unchanged.

b. Circuit Switch — Trunk

The forward address in this case is Y which is in the address set associated with channels to DSC's. The input flagged character A is transferred to the output character position of Y. The forwarding address remains unchanged.

c. Address Input Phase

The forwarding address initially in this case is Z and it specifies a particular half character store (4 binary bits) within a dynamically allocated call buffer store area. As each non-empty character is input and stored the forwarding address is incremented by one half character position. FIG. 3 illustrates the case where the seventh valid character is stored.

d. Addressed Data Block Mode

Operation in this case is similar to (c) except that the complete data content (8 bits) of non-empty characters are transferred. The forwarding address is incremented by one character position for each character stored. The FIG. 3 illustrates case where the 10th character is stored in an allocated store block.

The action during output is similar, characters being extracted from the character location specified by he forwarding address.

It is convenient to describe the switch operation by means of switch action programs indicating in detail actions taking place in the switch whilst carrying out typical functions forming part of the various services provided. Switch action programs are given in Table 4 for the following operations:

i. Request for Service A and C.

ii. Request for Service B and D.

iii. Set up, transmission and clearing for circuit switched transmission following request for Service A.

iv. Set up, transmission and clearing for circuit switched transmission following Request for Service C.

v. Set up, storage into blocks, and clearing for addressed data block transmission following Request for Service B.

vi. Set up, storage into blocks, and clearing for addressed data block transmission following Request for Service D.

vii. Set up, and the emission of characters at prescribed rates to local terminals for the addressed data block transmission.

Note:

The figures in parenthesis in the column headings refer to the corresponding number of conditions to be specified by the control bits.

TABLE 4a.—SWITCH ACTION PROGRAMME (i)

Request for Service A and C (Circuit Switch or addressed data block to an address to be input)

| | Control Conditions | | | | | | | | |
|---|---|---|---|---|---|---|---|---|---|
| | (16) | (2) | (1) | (1) | (1) | (2) | (9) | | |
| Input character | Forward address | Status count | Address phase | Data block operation | Data block output | Output rate | Output character | Switch store control and processer (P) actions | Switch store cycles per input character period |
| CL | 0 | 0 | 0 | 0 | 0 | 0 | CL | | (1) |
| RQ(A+C) | 0 | 0<br>1 | 0 | 0 | 0 | 0 | CL | | (1) |
| RQ(A+C) | 0 | 1<br>2 | 0 | 0 | 0 | 0 | CL | RQA/C+SSA ⟶ SQU ⟶ P | (2) |
| RQ(A+C) | 0 | 2 | 0 | 0 | 0 | 0 | CL | | |
| — | X | 2 | 1 | 0 | 0 | 0 | SDA | ⟵ P | |
| RQ(A+C) | X | 2 | 1 | 0 | 0 | 0 | SDA | | (1) |
| EMP | X<br>X | 2 | 1 | 0 | 0 | 0 | SDA | | (1) |
| AD 1 | X+½ | 0 | 1 | 0 | 0 | 0 | SDA | AD1 ⟶ | (2) |
| EMP | X+½ | 0 | 1 | 0 | 0 | 0 | SDS | | (1) |
| ADn | X+½<br>X+½+½ | 0 | 1 | 0 | 0 | 0 | SDA | ADn ⟶ (X+2) | (2) |
| ADN | $X+\frac{N}{2}$ | 0 | 0 | 0 | 0 | 0 | STP | ADN ⟶ $(X+\frac{N}{2})$ | (2) |
| EMP | $X+\frac{N}{2}$<br>0 | 0 | 0 | 0 | 0 | 0 | STP | AMC+SSA ⟶ SQU ⟶ P | (2) |

1 2 See footnotes at bottom of Table 4g.

TABLE 4b. SWITCH ACTION PROGRAMME (ii)

Request for Service B and D (Circuit Switch or addressed data block to an address in the control processor)

| | Control conditions | | | | | | | | |
|---|---|---|---|---|---|---|---|---|---|
| | (16) | (2) | (1) | (1) | (1) | (2) | (9) | | |
| Input character | Forward address | Status count | Address phase | Data block operation | Data block output | Output rate | Output character | Switch store control and processor (P) actions | Switch store cycle per input character period |
| CL | 0 | 0 | 0 | 0 | 0 | 0 | CL | | (1) |
| RQ(B+D) | 0 | 0<br>1 | 0 | 0 | 0 | 0 | CL | | (1) |
| RQ(B+D) | 0 | 1<br>2 | 0 | 0 | 0 | 0 | CL | RQB/D+SSA ⟶ SQU →P | (2) |
| RQ(B+D) | 0 | 2 | 0 | 0 | 0 | 0 | CL | | (1) |

1 2 See footnotes at bottom of table 4g.

TABLE 4c.—SWITCH ACTION PROGRAMME (III)

Set up, transmission and clearing for circuit switched transmission following Request for Service A

| | Control conditions | | | | | | | | |
|---|---|---|---|---|---|---|---|---|---|
| | (16) | (2) | (1) | (1) | (1) | (2) | (9) | | |
| Input character | Forward address | Status count | Address phase | Data block operation | Data block output | Output rate | Output character | Switch store control and processor (P) action | Switch store cycles per input character period |
| EMP | O | 0 | 0 | 0 | 0 | 0 | STP | ........................ | (1) |
| — | Y | 0 | 0 | 0 | 0 | 0 | SDD | ⟵ P | |
| EMP | Y | 0 | 0 | 0 | 0 | 0 | SDD | EMP ⟶ Y | (2) |
| DC1 | Y | 0 | 0 | 0 | 0 | 0 | SDD | DC1 ⟶ Y | (2) |
| DC2 | Y | 0 | 0 | 0 | 0 | 0 | SDD | DC2 ⟶ Y | (2) |
| DCn | Y | 0 | 0 | 0 | 0 | 0 | SDD | DCn ⟶ Y | (2) |
| EMP | Y | 0 | 0 | 0 | 0 | 0 | SDD | EMP ⟶ Y | |
| DCn+1 | Y | 0 | 0 | 0 | 0 | 0 | SDD | DCn+1 ⟶ Y | (2) |
| CL | Y | 0<br>1 | 0 | 0 | 0 | 0 | SDD | CL ⟶ Y | (2) |
| CL | Y | 1<br>2 | 0 | 0 | 0 | 0 | SDD | CL ⟶ Y | (2) |
| CL | Y<br>O | 2<br>3 | 0 | 0 | 0 | 0 | CL | CL+SSA ⟶ SQU<br>└→P | (2) |

[1] [2] See footnotes at end of Table 4g.

TABLE 4d.—SWITCH ACTION PROGRAMME (IV)

Set up, transmission and clearing for circuit switch transmission following Request for Service C

| | Control conditions | | | | | | | | |
|---|---|---|---|---|---|---|---|---|---|
| | (16) | (2) | (1) | (1) | (1) | (2) | (9) | | |
| Input character | Forward address | Status count | Address phase | Data block operation | Data block output | Output rate | Output character | Switch store control and processor (P) action | Switch store cycles per input character period |
| RQB | O | 2 | 0 | 0 | 0 | 0 | CL | | (1) |
| RQB | O | 2 | 0 | 0 | 0 | 0 | CL | | (1) |
| — | Y | 2 | 0 | 0 | 0 | 0 | SDD | ⟵ P | |
| EMP | Y | 0 | 0 | 0 | 0 | 0 | SDD | EMP ⟶ Y | (2) |
| DC1 | Y | 0 | 0 | 0 | 0 | 0 | SDD | DC1 ⟶ Y | (2) |
| DC2 | Y | 0 | 0 | 0 | 0 | 0 | SDD | DC2 ⟶ Y | (2) |
| DCn | Y | 0 | 0 | 0 | 0 | 0 | SDD | DCn ⟶ Y | (2) |
| EMP | Y | 0 | 0 | 0 | 0 | 0 | SDD | EMP ⟶ Y | |
| DCn+1 | Y | 0 | 0 | 0 | 0 | 0 | SDD | DCn+1 ⟶ Y | (2) |
| CL | Y | 0<br>1 | 0 | 0 | 0 | 0 | SDD | CL ⟶ Y | (2) |
| CL | Y | 1<br>2 | 0 | 0 | 0 | 0 | SDD | CL ⟶ Y | (2) |
| CL | Y<br>O | 2<br>3 | 0 | 0 | 0 | 0 | CL | CL+SSA ⟶ SQU<br>└→P | (2) |

[1] [2] See footnotes at end of Table 4g.

TABLE 4e.—SWITCH ACTION PROGRAMME (V)

Set up, storage into blocks, and clearing for addressed data block transmission following Request for Service C

| | Control conditions | | | | | | | | |
|---|---|---|---|---|---|---|---|---|---|
| | (16) | (2) | (1) | (1) | (1) | (2) | (9) | | |
| Input character | Forward address | Status count | Address phase | Data block operation | Data block output | Output rate | Output character | Switch store control and processor (P) action | Switch store cycles per input character period |
| EMP | 0 | 0 | 0 | 0 | 0 | 0 | STP | | (1) |
| | Y | 0 | 0 | 1 | 0 | 0 | SDD | ⟵ P | |
| DC1 | Y<br>Y+1 | 0 | 0 | 1 | 0 | 0 | SDD | DC1 ⟶ Y | (2) |
| DC2 | Y+1<br>Y+2 | 0 | 0 | 1 | 0 | 0 | SDD | DC2 ⟶ Y+1 | (2) |
| EMP | Y+2 | 0 | 0 | 1 | | 0 | SDD | | (1) |
| DC3 | Y+2<br>Y+3 | 0 | 0 | 1 | 0 | 0 | SDD | DC3 ⟶ Y+2 | (2) |

TABLE 4e.—SWITCH ACTION PROGRAMME (V)—Continued

Set up, storage into blocks, and clearing for addressed data block transmission following Request for Service C

| Input character | Control conditions (16) Forward address | (2) Status count | (1) Address phase | (1) Data block operation | (1) Data block output | (2) Output rate | (9) Output character | Switch store control and processor (P) action | Switch store cycles per input character period |
|---|---|---|---|---|---|---|---|---|---|
| DCn | Y+n−1<br>Y+n | 0 | 0 | 1 | 0 | 0 | SDD | DCn ⟶ Y+n−1 | (2) |
| DCN | Y+N−1<br>Z | 0 | 0 | 1 | 0 | 0 | SDD | DCN ⟶ Y+N−1<br>Z ⟵ SQU(ADB) ⟵ P<br>Y+SSA ⟶ SQU(ADB) ⟶ P<br>where Z=next pointer | (4) |
| DC(N−1) | Z<br>Z+1 | 0 | 0 | 1 | 0 | 0 | SDD | DC (N+1) ⟶ Z | (2) |
| EMP | Z+1 | 0 | 0 | 1 | 0 | 0 | SDD | | (1) |
| DC(N+2) | Z+1<br>Z+2 | 0 | 0 | 1 | 0 | 0 | SDD | DC (N+2) ⟶ Z+1 | (2) |
| CL+CLT | Z+n<br>Z+n+1 | 0 | 0<br>1 | 1 | 0 | 0 | SDD | (CL+CLT) ⟶ Z+n | (2) |
| CL+CLT | Z+n+1<br>Z+n+2 | 0 | 1<br>2 | 1 | 0 | 0 | SDD | (CL+CLT) ⟶ Z+n+1 | (2) |
| CL+CLT | Z+n+Z<br>0 | 0 | 2<br>3 | 1<br>0 | 0 | 0 | CL | (CL+CLT) Z+SSA ⟶ SQU<br>⟶P | |

TABLE 4f.—SWITCH ACTION PROGRAMME (VI)

Set up, storage into blocks and clearing for addressed data block transmission following request for Service D

| Input character | Control conditions (16) Forward address | (2) Status count | (1) Address phase | (1) Data block operation | (1) Data block output | (2) Output rate | (9) Output character | Switch store control and processor (P) action | Switch store cycles per input character period |
|---|---|---|---|---|---|---|---|---|---|
| RQD | 0 | 2 | 0 | 0 | 0 | 0 | CL | | (1) |
| RQD | Y<br>Y | 2 | 0 | 1 | 0 | 0 | SDD | ⟵ P | |
| DC1<br>As for switch action programme (v) | Y+1 | 0 | 0 | 1 | 0 | 0 | SDD | DC1 ⟶ Y | (2) |

[1] [2] See footnotes at end of Table 4g.

TABLE 4g.—SWITCH ACTION PROGRAMME (VII)

Set up, and the emission of characters at prescribed rates to local terminals for the addressed data block transmission

| Input character | Control conditions (16) Forward address | (2) Status count | (1) Address phase | (1) Data block operation | (1) Data block output | (2) Output rate | (9) Dedicated output character | Common output character register | Switch store control and processor (P) actions | Switch store cycles per input character |
|---|---|---|---|---|---|---|---|---|---|---|
| CL | O | 0 | 0 | 0 | 0 | O | CL | CL | | (1) |
| CL | O<br>O | 0 | 0 | 0 | 0 | O<br>O | REC<br>REC | REC<br>REC | ⟵ P | (1) |
| SDD | O | 0<br>1 | 0 | 0 | 0 | O | REC | REC | | (1) |
| SDD | O | 1 | 0 | 0 | 0 | O | REC | REC | SDD + SSA ⟶ SQU<br>→P | (1) |
| SRD | O<br>Y | 2 | 0<br>0 | 1 | 1 | O<br>RX | REC | | ⟵ P | |
| SDD | Y<br>Y+1 | 2 | 0 | 1 | 1 | RX | REC | DC1 | DC1 ⟵(extracted from) Y; case where output rate=½ channel rate | (2)<br>(1)<br>(2) |
| SDD | Y+1 | 2 | 0 | 1 | 1 | RX | REC | EMP | DC2 ⟵ Y + 1 | |
| SDD | Y+1<br>Y+2 | 2 | 0 | 1 | 1 | RX | REC | DC2 | | |
| SDD | Y+N−1<br>Y−L | 2 | 0 | 1 | 1 | RX | REC | DCN | DCN ⟵ Y + N − 1 | (2) |
| SDD | Y−L | 2 | 0 | 1 | 1 | RX | REC | EMP | WAIT ⟵ Y−L | (2) |
| SDD | Y−L | 2 | 0 | 1 | 1 | RX | REC | EMP | WAIT ⟵ Y−L<br>Z ⟶ Y−L by P | (2) |
| SDD | Y−L<br>Z | 2 | 0 | 1 | 1 | RX | REC | EMP | Z ⟵ Y−L | (3) |

TABLE 4g.—SWITCH ACTION PROGRAMME (VII)

Set up, and the emission of characters at prescribed rates to local terminals for the addressed data block transmission

| | Control conditions | | | | | | | | | |
|---|---|---|---|---|---|---|---|---|---|---|
| | (16) | (2) | (1) | (1) | (1) | (2) | (9) | | | |
| Input character | Forward address | Status count | Address phase | Data block operation | Data block output | Output rate | Dedicated output character | Common output character register | Switch store control and processor (P) actions | Switch store cycles per input character |
| SDD.. | Z<br>Z+1 | 2 | 0 | 1 | 1 | RX | REC | DC(N+1) | DC(N+1) ⟵ Z<br>DBE+SSA – SQU<br>→P | [3] |
| SDD.. | Z+1 | 2 | 0 | 1 | 1 | RX | REC | EMP | | |
| SDD.. | Z+1<br>Z+2 | 2 | 0 | 1 | 1 | RX | REC | DC(N+2) | DC(N+2) ⟵ Z+1 | [2] |
| SDD.. | Z+2 | 2 | 0 | 1 | 1 | RX | REC | EMP | | |
| SDD.. | Z+n<br>Z+n+1 | 2 | 0 | 1 | 1 | RX | (CL(1)) | CL | DC(Z+n)=CL ⟵ Z+n | *[3] |
| SDD.. | Z+n+1<br>Z+n+2 | 2 | 0 | 1 | 1 | RX | (CL(2)) | CL | DC(Z+n+1)=CL ⟵ Z+n+1 | *[3] |
| SDD.. | 0 | 2 | 0 | 0 | 0 | 0 | CL | CL | DMC+SSA ⟶ SQU<br>→P | [2] |
| Y—L | | | | | | | | | Idle<br>Wait ⟵ Y—L | |
| | | | | | | | | | Idle<br>Wait ⟵ Y—L | |
| | Y—L | | | | | | | | Z to Y—L | |
| | Z | Z | 0 | 1 | 1 | RX | Ru | | E. DUB + Y ⟶ SQU<br>→P | |

[1] N and M assumed even,
[2] += or in input character column.
[3] ???????

The following notes relate to the switch action programmes in Table 4.

Programme (i). A zero forwarding address indicates a cleared condition and inhibits the count of Clear signal characters. The second Request character initiates the transfer of the Request for Service character and the switch store address, which is equivalent to the incoming channel address, to the local area signalling queue in the switch store. RQA/C + SSA SQU.

This signal is subsequently picked up by the processor which as a result:

a. allocates a call buffer area (16 characters) in the switch store and inserts, in the forwarding address of the dedicated channel word, the address within the allocated buffer where the incoming address is to be stored i.e., X in Table 4.

b. inserts the address phase bit in the dedicated word.

c. inserts the character 'Sand Dr a' in the dedicated word.

A signal character inserted in the output character store is rewritten when read out. Subsequently the address characters arrive and are stored contiguously in the store by incrementing the forward address with each incoming data character. In this case the address is packed two decimal digits to a character, hence the forward address is incremented by half characters.

It is assumed in this case that the address message is of fixed length and the message end is hence defined by the forwarding address when it has changed by a predetermined amount. An alternative is to use an End of Address message signal character.

It will be noted that empty characters are discarded.

At the end of the address-message the Address-Message Complete character and switch store address are transferred to the local signalling queue.

It should be noted that:

a. The status count is reset by a date character b. The control conditions are reset at the end of the address.

c. Send character changed to Stop character at the end of the address phase, if necessary.

Programme (ii). No address phase. Address transferred to call buffer by processor.

Programme (iii). In this case the processor action is to insert the forwarding address and the character Send Data. The forwarding address specifies the output character store in a dedicated word associated either with the corresponding local area or with the trunk circuit switched channels. The forwarding address is not incremented in this case.

The connection is broken when two consecutive Clear characters are detected. A Clear signal character and switch store address are transferred to the local signalling queue and the corresponding output character is set to Clear. The Clear signal is subsequently picked up by the processor for further action such as release of call buffer; tariff calculation etc.

Programme (iv). Operations are similar to (iii) with slightly different start conditions.

Programme (v). The processor allocates an addressed data block area and inserts the forwarding address corresponding to the data area in the dedicated word together with the data block operation bit and the Send Data character.

The forwarding address is incremented with each non-empty character. The forwarding address is incremented until the last character location in the allocated block is specified. The action then is as follows:

a. The old pointer is replaced with a new pointer contained in the new pointer register.

b. The old pointer together with the switch store address is transferred to the signalling queue. A new pointer is extracted for insertion in the new pointer register from a queue of unused pointers.

Characters are now stored in the new block until either another block is required or the message is complete. In the latter case the second consecutive Clear or Temporary Clear character together with the current or incremented pointer and store switch address are transferred to the local area signalling queue. Also the control conditions except the status count, are set to zero and the output character is set to Clear.

Programme (vi). This is similar to (v) but start conditions are slightly different.

Programme (vii). The initial processor switch store action when a block is to be output is to insert the Receive character in the output character store. Subsequently the terminal sends the Send Data character, the second of which is transferred with the switch store address to the processor. This operation of asking the terminal if it is ready may be unnecessary.

The subsequent processor action is to insert:

a. appropriate block pointer in the forwarding address store.

b. a 1 to designate data block operation.

c. a 1 to designate data block output operation.

d. the output rate conditions.

The output rate can be set at normal maximum channel rate or some agreed sub-multiples of the maximum rate. Alternatively the output may be on demand; the demand being indicated by the arrival of a particular signal character from the terminal.

The example in the table is for the case where output rate is half maximum rate. Empty characters are output to fill the channel capacity. The pointer is incremented only at times when a valid character is transmitted.

The output character derived from the data block in store is not inserted in the output character position in the dedicated word but is placed directly into the switch store output character register.

The output procedure continues either until the whole block is emitted or until some indication is given of end of message. Consider the former condition.

One possible procedure is to arrange for the pointer after the emission of the last character to address the first word of the block, which is arranged to contain the pointer corresponding to the next block, or to specify an idle or wait indication. This means that the processor, on receipt of the next block, inserts the corresponding pointer in the first word position of the previous block which would contair he wait condition. The presence of a pointer cuases the transfer to the forwarding word store. At the next character period an End of Signal Block character, and the switch store address, are transferred to the local area signalling queue for the function of releasing the previous block of storage. Output continues at the following character period.

The End of Message for the actions illustrated in the table is indicated by a Clear character in the block. To maintain transparency this would mean storing 9 bit characters. The alternative, of having the content of the block specified in the header of the block, can be dealt with by using the output character store per dedicated word for the necessary count operation. The output character store is not used during the output of data blocks. The number specifying the content of the block in terms of characters is inserted into the output character store concurrent with the insertion of the pointer.

In the case illustrated, the count of Clear characters (2) for determining end of message is organized by the use of one bit in the output character store of the dedicated word.

A Data Message Complete character and the switch store address are transferred to the signalling queue with the second Clear character.

There are two types of clearing operations which are defined below:

a. Temporary Clear specifies completion of transmission for the present. Then possible actions are:

i. Release the circuit switch connections.

ii. Transmit contents of the current data block.

In this case the destination terminal is not released and source and destination call buffers are maintained.

b. Clear specifies completion of transmission. The subsequent possible actions are:

i. Release all switch connections ii. Transmit contents of the current data block.

iii. Release destination terminal.

iv. Release call buffers.

v. Carry out system actions such as tariff calculations.

The transmission of the Clear signals can be effected in either of two ways:

1. The Clear signal can be detected at the source or destination DSC and transmitted via transit DSC's to the destination or source DSC respectively by a signal message. At each DSC the clear signal initiates the appropriate actions discussed above. A return message may be necessary to acknowledge the transmission of the Clear signal message.

2. The Clear signal can be transmitted as an in-channel signal character between DSC's. Each DSC detects the Clear character by the action of the dedicated word which is consequently set to the idle condition and an appropriate signal is inserted in the signalling queue to the processor.

Provision of storage for signal characters in the Addressed Data Block case permits the same end to end signalling capability as in the case of circuit switching and some simplifications in the control operations. The disadvantage is the one eighth increase in storage and transmission requirements. The transmission of signal characters would provide means for designating empty characters in the trunk network.

The specification of the block length by a number in the header specifying the number of characters or segments is more efficient in terms of storage and transmission.

It is proposed that storage data blocks allocated for data block transmission will be of two fixed sizes viz 16 characters and 128 characters, but transmitted data will probably be in blocks of variable length.

The data transfer supervisory bit is one of the seven control bits shown in FIG. 2. Its function is to monitor the throughput of a given connection in both circuit switching and addressed data block modes. The supervisory bit is set at regular intervals which probably should be different for different bit rates. The setting operation can be readily organized by hardware due to the cyclical nature of the hardware. The supervisory bit is reset by an incoming data character and can perform a time-out function for the current operation.

If the supervisory bit is not in the reset state at the instant it is normally set, a signal message to that effect can be queued. A store cycle for this operation exists because, by inference, no appropriate action is occurring. The resulting action taken by the control processor will be dependent on the class of service data relating to the terminal.

The provision of a monitoring action on the DSC throughout ensures that the DSC does not become blocked by uncleared calls.

The possible rules which could apply to character circuit switched transfers in the switch store are as follows:

a. When the output character is extracted for transmission its replacement in store is dependent on the nature of the character that has been extracted. Thus:

| Output Character | Replacement Character |
|---|---|
| Data | Empty |
| Empty | Empty |
| Special Status Set (terminal to terminal) | Empty |
| DSC to terminal signal | Extracted and regenerated |
| DSC to DSC signal (CLEAR) | Extracted and regenerated |

b. Transfer of a character to the output character store in the dedicated word is dependent on the input character and the contents of the output character store, thus:

| Input Character | Store Character content permitting transfer |
|---|---|
| Data | All |
| Special status set | All |
| Empty | Empty (effectively not transfer) |
| Terminal to DSC signal | Clear signals when |
| DSC to DSC signal | clearing inband |

c. The processor has free access to insert characters at all times. The actions occurring when interconnecting channels of different bit rates are described with reference to 12 Kb/s and a 750 b/s channel. There are two cases.

CASE 1

Input 12 Kb/s : Output 750 b/s

Input data characters must be at 750 b/s or lower. The interleaved empty characters are effectively discarded.

CASE 2

Input 750 b/s : Output 12 Kb/s

Empty characters are inherently emitted between data characters.

Figure 4:
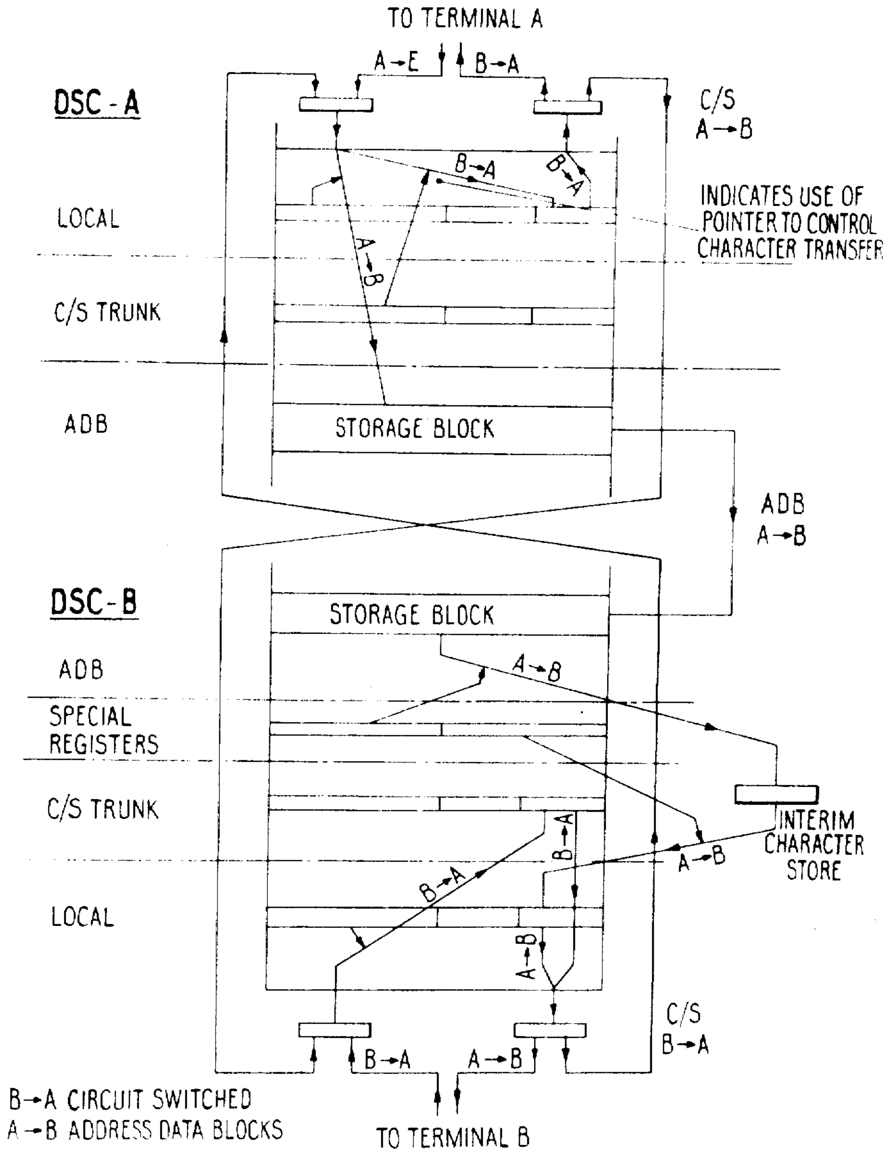
FIG. 4 illustrates an example of possible concurrent duplex circuit switched and addressed data block terminal operations between two DSC's.

Concurrent duplex circuit switched and addressed data block terminal operation is feasible with reference to the proposed system. The operation may be of use as a means of communicating small amounts of control data at low bit rates in the reverse direction to a high speed circuit switch connection. The method is described with reference to FIG. 4.

Consider the case where circuit switched connection exists with data being transferred from B to A. The communication channel between A and its DSC is free, and data can be transferred and stored in blocks for transfer, provided the DSC was informed at the outset of the connection. (A storage block can be allocated in real time by a special block beginning character). The operations at the DSC are those normal to Addressed Data Block operation.

Conditions at the destination DSC are more restricted in that the forwarding address part of the dedicated word is occupied with the circuit switch pointer. This can be circumvented by providing a set of words addressed analogously to the channel dedicated store words, but which are not associated with input/output channels. These words would be addressed at the 750 b/s rate. These words contain two pointers, one for extracting the character from the storage block and one for specifying the dedicated word corresponding to the connected terminal. The operation of inserting the character in the output character store involves three store cycles. The additional store words are dynamically allocated on a per output block basis.

The switch store throughput is discussed with reference to the use of a 10 bit network envelope and the use of a character as the basic unit for transfer in the switch. The effective input channels to the switch are assumed to be 48 Kb/s channels containing data channels of 750 b/s, 3 Kb/s and 12 Kb/s terminal data channels when multiplexed. The corresponding input character period is $(10/48K) = 208\ \mu s$. It follows that a character has to be extracted from each 48 Kb/s line terminating unit every 208 $\mu s$, which thus defines the basic switch input scan period, termed the minor scan period.

The number of 48 Kb/s channels which an be handled by one switch store is then determined by the store cycle time and the number of switch store cycles per input character, in relation to 208 $\mu s$, required to effect the following:

a. Transfer of character being input and output on 48 Kb/s channels of the local area network and circuit switched channels of the trunk network between DSC.

b. Queueing of signals relating to (a).

c. Transfer of characters being input and output on the trunk addressed data block network between DSC.

d. Queueing of signals relating to (c).

e. Communication between processor and switch store.

Consider each of the above.

Analysis of the switch store actions given in Table 4 indicates that more than two store cycles per incoming character are required only for input characters which are either stored in the last character position in a block or which define Message End in the address data block transmission mode. During the idle condition, in which incoming channel characters are monitored for signal characters and Clear characters are output, only one store cycle is required. Normal data transmission in both circuit switched and addressed data block cases requires two store cycles.

Operations indicated in Table 4 as requiring 3 store cycles but which are marked by an asterisk can be postponed if, for example, a third store cycle is not available as a result of using a priority access system. It can be arranged that a change in the significant stored data takes place on the third cycle within the character period, which permits the operation to be delayed to the next character period.

The operation indicated as requiring 4 store operations is more difficult in that a new forwarding address must be inserted, and the old forwarding address together with the switch store address, queued, before the next corresponding character is input. The time intervals between characters is dependent on bit rate as follows:

750 b/s = 14 msecs
3 Kb/s = 3.2 msecs
12 Kb/s = 750 μsecs
48 Kb/s = 208 μsecs

To ensure that the change of forward address, and the corresponding signalling, is performed in time for all channel rates, and taking cognizance of the fact that more than one channel may require a similar operation concurrently, the complete operation is permitted to take place in the corresponding character period.

A suitable method involves a separate queue in the switch store. This contains a queue of free pointers and a queue of old pointers and associated switch store addresses. The switch operation in the third cycle period is to extract a new pointer and insert into the same location the old pointer and switch store address. The relevant queue address is realized as a read-only base and a counter modifier.

A preferred method is to signal the completion of a block at the time the last character is stored and to replace the existing pointer with a new pointer from the New Pointer Register at the next character time slot, to use that new pointer for storing a character if one exists and to replace the contents of the next pointer register from a queue of free or new pointers in the switch store as a third store cycle in that time slot.

The throughout of addressed data blocks is determined by the store cycle time, percentage of store cycles allocated, and their distribution. Whereas it is essential at all times to provide capability for receiving incoming data so as to avoid the need for retransmission, it is not essential at all times to have data available for output, provided means are included for transmitting empty groups of digits. Thus a status bit per group of 17 bits, for example, can be used as in the case of the network, envelope to define an empty group. This method can be used to improve store utilization by providing for a non-error generating condition during short term abnormal store condition. The cost is a lowering of normal transmission efficiency by approximately 6 percent. The incoming trunk data is given priority relative to output data.

It is important that operation needed when a complete data block has been transmitted or received do not involve the use of switch store cycles in excess of what is required during normal transmission. This restriction avoids a build up of demands on the store with consequent malfunction of one or more operations. Thus an inter-block gap equivalent to the number of bits normally transferred to store is necessary and adequate to avoid a build up of demands on store.

At the completion of each incoming inter DSC block it is necessary to queue the storage pointers and to insert new pointers for the reception of the next block. It is probably necessary to keep trunk pointer queues separate from those of the local area so that processing priorities can be effected in order to minimize delays in the high level and the amount of storage required. One queue for all incoming trunk links is adequate.

Output links require individual queues but the operation at the completion of the emission of each block is simpler in that it is only necessary to extract a new pointer from the appropriate queue in the store. It is readily arranged for this to occur at a time when normally data transfer would take place. This inherently gives rise to a single group gap.

Summarizing the above, the switch trunk data block throughput is directly related to the store cycle times and the percentage cycles allocated. Control operations at inter block periods need not demand an increase in store cycles required. The throughput can be increased by making use of store cycles allocated to other functions but not used, provided the transmission of empty groups of bits is permitted.

It is important in the addressed data block mode that the average processor waiting time for access to the switch store should be small compared to the average processor time to process the data extracted or stored. Occasional relatively long waiting periods are acceptable. In this case the switch store has an interface to the processor which is substantially identical to the processor data and programme stores. For a purely circuit switched case alternate access methods are practical.

The throughput capability of a single switch store and how it is related to the two modes of transmission will now be indicated.

A basic parameter is the cycle time of the store. Random access stores having a cycle time of 650 nsecs are readily available at a cost insignificantly higher than stores of longer cycle times. An assumption for calculation is made therefore that the basic switch cycle time will equal 650 nsecs. Means for random access digital storage having cycle times of 250 nsecs or less are becoming available with integrated circuit techniques. It is interesting to note that larger words is an inherent feature of fast word organized stores.

Consider now the performance resulting from having a four store cycles per input character scan period, and the following allocation.

1. Normal switch store operation relating to local and
2. circuit switched trunk transmission.
3. Communication between switch store and processor, abnormal operations related to 1 & 2.
4. Trunk addressed data block transmission.

The input character scan period is now $4 \times 650 = 2.6$ μs. It follows that the number of 48 Kb/s input channels that can be accepted in $(208/2.6) = 80$. This value is independent of the number of effective channels per 48 Kb/s channel.

The table below indicates various distributions of channels that could be accommodated.

| Channel Rate | Number of Channels | | | | | | | |
|---|---|---|---|---|---|---|---|---|
| 600 b/s | 5120 | 0 | 0 | 0 | 1280 | 960 | 1280 | 1720 |
| 2.4 Kb/s | 0 | 1280 | 0 | 0 | 320 | 400 | 410 | 320 |
| 9.6 Kb/s | 0 | 0 | 320 | 0 | 80 | 80 | 60 | 60 |
| 38.4 Kb/s | 0 | 0 | 0 | 80 | 20 | 20 | 20 | 16 |

It should be noted that these figures refer to the switch only and the number of terminals will be increased by the concentration factor.

Assuming that the trunk link pointers are realized as hardware registers and that transfer to store is in groups of 16 bits, then corresponding trunk switch throughput is $(16/2.6) \cong 6$Mb/s per second total (input + output). This corresponds to approximately 4,500 1,000 bit data blocks per second. Since store cycles 2 and 3 are not fully occupied, the addressed data block throughput can be increased provided that the use of empty bit groups is permitted or by additional external buffer storage for output.

Other character period store cycle sequences can be conceived, dependent on estimated traffic requirements. For example, a three cycle per character period sequence in which alternate third cycles are used for trunk addressed data block transmission or for processor to switch store communication. This would provide increased local and circuit switch trunk transmission capacity in return for a lower trunk addressed data block capacity.

The switch store as described is completely non-blocking with reference to the local incoming channels in that each can be connected and be transmitting and receiving concurrently.

The switch throughput calculations referred to above were based on the use of one store cycle sequence each per local and circuit switched trunk character. The first two cycles were allocated to character transfers, the third for processor access and some switch signalling actions, and the fourth for the trunk addressed data blocks. As stated, store access for the latter can be permitted in cycles 2 and 3. By arranging for the free/busy conditions of the channels to be held in an additional store, addressed in the identical manner to the switch store, access to the switch store need only occur when input/output channels are in use. More efficient use of the switch can be achieved in this way and a potentially greater throughput of characters as well as blocks by a rearrangement of the store cycle sequence.

In the switch store system described, call buffer storage areas are dynamically allocated by the processor. The same applies initially to addressed data blocks. Additional blocks for the longer messages are allocated effectively on-line. The same principle can be applied to all storage allocation. Decoding of the Initial Request character could cause the transfer of a pointer from the appropriate next pointer register. The outcome would be less processing time per call.

Figure 5:
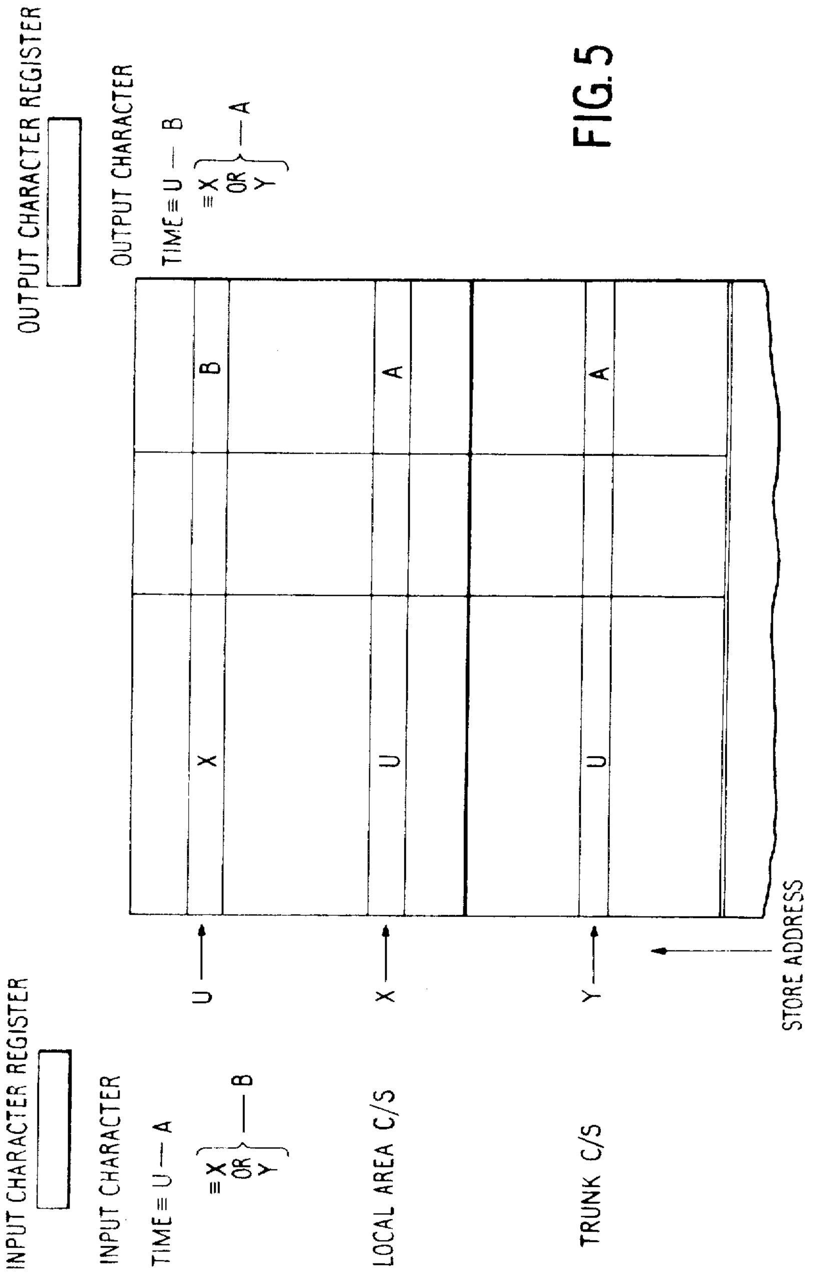
FIG. 5 is a diagram illustrating the transfer operations in the store for circuit switched duplex connections.

The switch design provides means for setting up simplex and duplex connections. The operation of the switch store in the duplex connections case is illustrated in FIG. 5. It is evident that duplex connections require the insertion of two pointers. One set-up procedure is to set-up the connection after determining the availability of the destination terminal. The switch store of each DSC in the connectio, path is set-up as a result of information contained in the return signal message from the destination to source DSC. Data related to the availability of channels are held in one DSC only.

Figure 6:
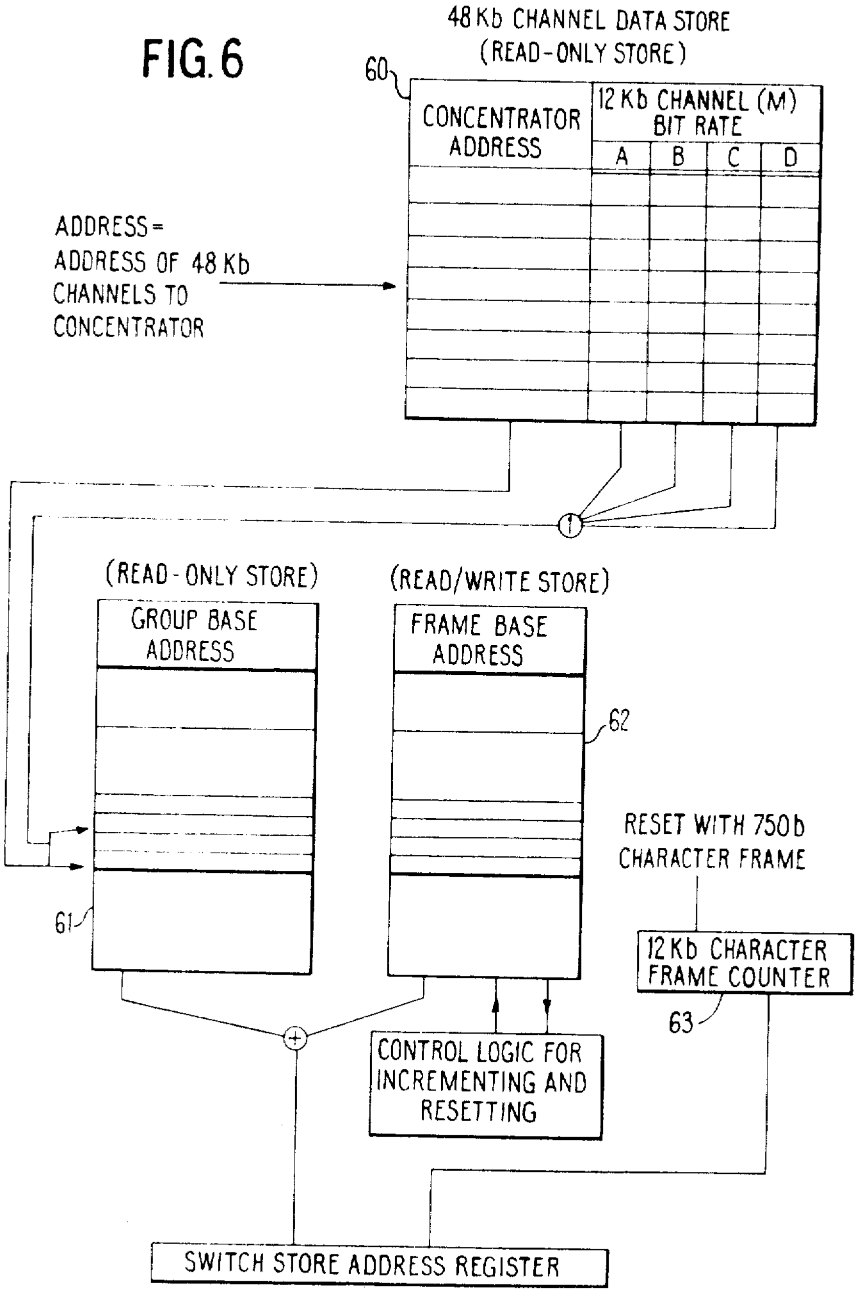
FIG. 6 is a block diagram illustrating the generation of switch store address for concentrator input/output channels.

The generation of store addresses for concentrator input/output channels for the case where each 48 Kb channel has a mixed multiplexed structure is as follows. It is assumed that due to the inherent properties of the concentrator the contents of the incoming 48 Kb/s channels at the DSC can be arranged to be 750 b/s character frame aligned. The method of deriving the associated channel store address is a counting procedure associated with aligned multiplexer frames, described here with reference to FIG. 6.

Each incoming 48 Kb/s channel has a dedicated word in a read-only store 60 which contains the associated concentrator address and data specifying the bit rate of the four 12 Kb/s channels as 750 b/s, 3 Kb/s or 12 Kb/s, or whether the four 12 Kb/s channels provide one 48 Kb/s channel. This store, termed the 48 Kb/s channel data store, is scanned each character period in a suitable phase relationship to the scanning of the 48 Kb/s channel interface units for input and output. At each access a concentrator address is extracted together with the related bit rate data.

The extracted data is used to address a read-only Group Base Address store 61, and a Frame Base Address store 62. Base Addresses in the former store refer to the switch store and specify the position in the store of the dedicated switch storage for the specified concentrator and specified bit rate channels. The Frame Base Address store effectively provides count registers for counting the number of 12 Kb/s channels of each bit rate and the number of 48 Kb/s channels per concentrator. Registers counting 12 Kb/s channels are reset every four-character scan period, i.e., 12 Kb/s frame period, and registers counting 48 Kb/s channels are reset every character scan period, i.e., 48 Kb/s character period.

A single 12 Kb/s frame counter 63 provides the Frame Channel Address.

The Switch Store Address is formed by adding the Group Base Address and the Frame Base Address suitably positioned and combining with the Frame Channel Address.

The storage required to form the Switch Store Address on this basis comprises a. one word per 48 Kb/s channel in the 48 Kb/s channel data store — (11 bit word).

b. four words per concentrator in the Group Base Address store — (12 bit word but this can be reduced by segmentation.)

c. four words per concentrator in the Frame Base Address store — (5 bits).

The concentrator address in 60 alternatively can be generated by the use of a counter which is incremented when the last 48 Kb/s channel in a concentrator group is being scanned.

The read-only stores need to be changeable stores in order to permit extensions and modifications to the network structure.

For the generation of store addresses for DSC channels each group of 48 Kb/s channels from one DSC to another will be frame aligned. A single 750 b/s character frame detector and synchronization unit is then sufficient. The character counter for the latter operation permits all the other frames to be defined. The two least significant stages of the counter provides the address for the 4 × 12 Kb/s channels and hence can be used for addressing the bit rate data in the corresponding 48 Kb/s channel data store. The proposed method of deriving the Frame Base Address is to count the number of 12 Kb/s channels allocated to each bit rate per group of 48 Kb/s channels from each DSC. The relevant counter registers are words in the Frame Base Address store. The Frame Channel Address is derived from the group synchronization counters. The Group Base Address is patched in a read-only store.

Inter DSC operation differs from concentrator to DSC operation in that the multiplexing frame of each incoming group of 48 Kb/s channels is not aligned with the DSC frame. Consider FIG. 7. F1 is the outgoing 750 b/s frame of DSC A, the frame being defined by specific bit pattern on an allocated channel per group. F2 is a typical corresponding frame after character alignment at DSC B. F1 is aligned with the DSC A frame, and for this reason DSC A is termed the master DSC with reference to the DSC A — DSC B link.

The addressing of the DSC B switch store is organized in the specified manner making use of the Group Base Address, the Frame Base Address derived from the relevant counter register, and the Channel Address from the corresponding group character count register. The Frame Base Address count registers are reset at times specified by the corresponding group character count register. The corresponding group output frame is aligned to the input frame, i.e., F2 applies for input and output. DSC B is termed the slave DSC with reference to the DSC A — DSC B link in that the frame position is controlled by DSC A.

Frame F3 indicates that the time position at DSC A of the frame F2 output from DSC B. F4 is the frame position after character and 12 Kb/s frame alignment. The latter operation requires a maximum of four words per 48 Kb/s channel at the master DSC A. The necessary storage has been combined with the Frame Base Address store.

Figure 7:
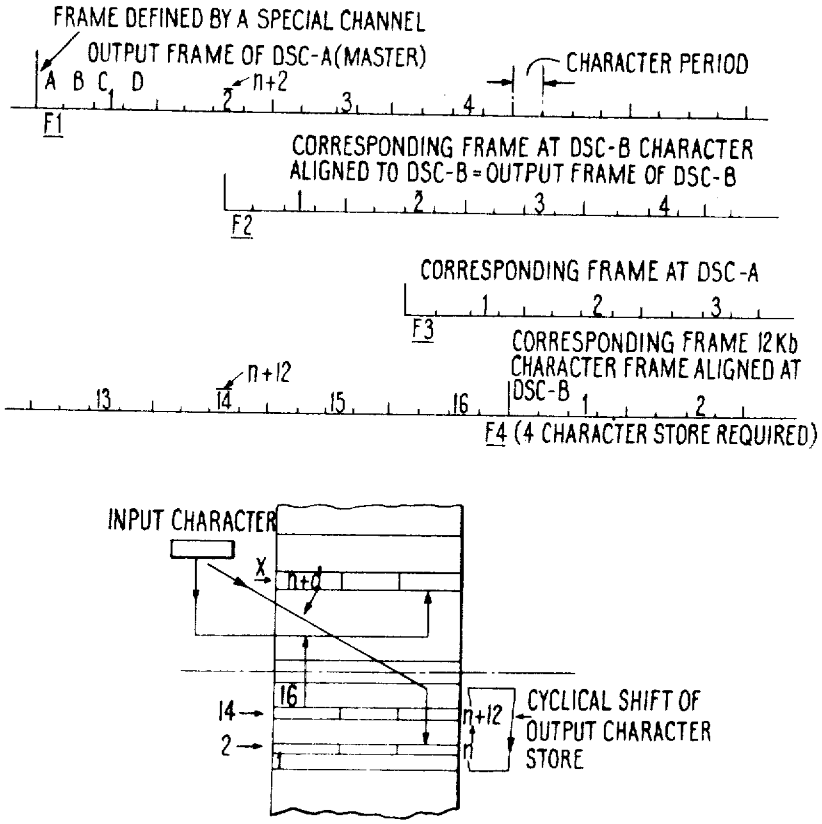
FIG. 7 illustrates inter DSC frame relationships and associated switch store operation.

It is clear from FIG. 7 that the outgoing frame from DSC A – B and the corresponding incoming frame are misaligned by an integral number of 12 Kb/s frame periods. Hence the character transfers for corresponding output/input channels in DSC A cannot take place in the same character scan period as it does in the case of concentrator channels. However, because of the 12 Kb/s frame alignment, incoming and outgoing channels are related in that they belong to the same multiplexed 12 Kb/s channel and its associated dedicated storage. Thus it is possible for the characters being output to be phased relative to the incoming characters by an integral number of characters dependent on the delay so that the return frame at DSC B is aligned to the outgoing frame at B. This is readily organized by modifying the pointer which controls the transfer of the character being output by DSC B by an amount dependent on the delay in terms of an integral number of 12 Kb/s character frame periods. This means that the characters being output are inserted in the same storage area dedicated to the channels of the multiplexed 12 Kb/s channel, but in store positions cyclically shifted by an amount dependent on the delay. This is illustrated in FIG. 7.

FIG. 7 illustrates the case where the characters in 750 b/s channel 2 of multiplexed 12 Kb/s channel *c* are inserted in the dedicated word corresponding to the 750 b/s channel 14. This, as described above, is organized by modification of the pointer in the dedicated word corresponding to the input channel being switched, i.e., X in FIG. 7. Each group of inter DSC links has an associated modifier according to the delay. The modification is performed on the pointer in the master DSC as an inherent part of the set-up procedure. The above system obviates the need for additional frame storage for alignment purposes.

Figure 8:
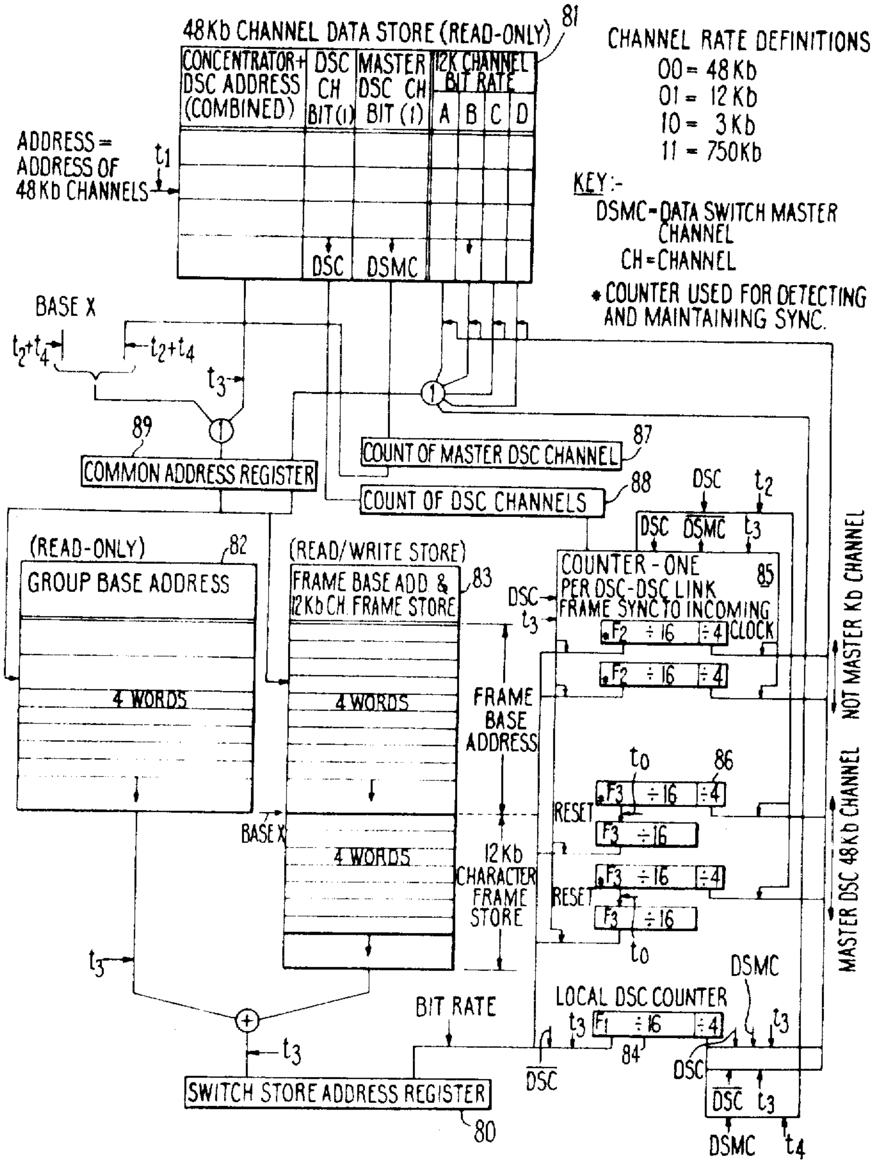
FIG. 8 is a block diagram illustrating the generation of associated switch store address for concentrators and DSC channels.

FIG. 8 is a block schematic of the system for generating the address for both concentrator and DSC channels.

Each 48Kb channel has a dedicated word in preferably a read only store 81 which contains a. the associated concentrator channel address.

b. four (N5 for both channels) sets of digits (e.g., two) specifying the constituent 12 Kb/s channel multiplexed bit rates.

c. a digit (DSC) specifying whether the 48Kb/s channel is an inter DSC link d. a digit (DSMC) specifying whether the local DSC is master of the inter- DSC link.

The extracted data is used to address a read only Group Data address Store 82 and a Frame Data address Store 83. The base address refers to the switch store and specifies the start of the Storage areas allocated to the dedicated channel words per 48Kb/s channel for groups of 48 Kb/s channels linking the local DSC with concentrator and other DSC's. The frame Data address Store effectively provides count registers for counting the number of 12Kb/s channels associated with each bit rate. Registers counting 12 Kb/s channels which provide transmission at 12 Kb/s as lower are reset every 12 Kb/s frame period every 4 - 48 Kb/s character periods. Registers counting 48 Kb/s channels are reset every character.

In this case the 750 b/s character frame of the outgoing and incoming concentrator channels and master DSC are aligned with the local DSC switch frame, which is controlled by the local DSC frame character counter 84. The frame of incoming channesl from master DSC's to slave DSC's are arbitrarily positioned and determined by associated frame character counters 85. The corresponding outgoing frames are aligned with the incoming frames.

Counters 87 and 88 provide means for addressing the appropriate frame character counter register. The counters are in incremented appropriately dependent on the contents of the channel data store. The counters are reset every 48 Kb/s character scan period.

The storage required for achieving 12 Kb/s frame alignement is shown combined with the Frame Base address store 83.

The basic principles are illustrated with reference to the use of a four beat sequence the actions in each beat being as follows:

$t_1$ — Extract data from channel data store.

$t_2$ — Store characters for channels requiring alignment in Store 83. The relevant address is formed in the common address register 89 from the associated base address X, the content of the count of master DSC channel register 87 and the two bort significant digits of the appropriate frame character count registers 86.

$t_3$ — Form Switch Store address in register 80 from data extracted from the group base address store 82, the frame base address store 83 and part of the contents of the appropriate frame character count register 84, 85 and 86. The address of the group base and frame base address stores is first formed in the common address register 88 from data extracted from the channel data store part of which is selected by the least significant digits of this appropriate forms character count registers 84, 85 & 86.

$t_4$ — Extract Stored Channel Characters in frame alignment. The address differs from that in $t_2$ in that the least significant digits are derived from this local DSC frame character counter 84.

An alternative arrangement which gives rise to simplification of the address generation procedure is to demultiplex the 48 Kb/s channels at the DSC input to provide 12 Kb/s unirate multiplexed channels which are subsequently remultiplexed to provide higher rate multiplexers.

Figure 9:
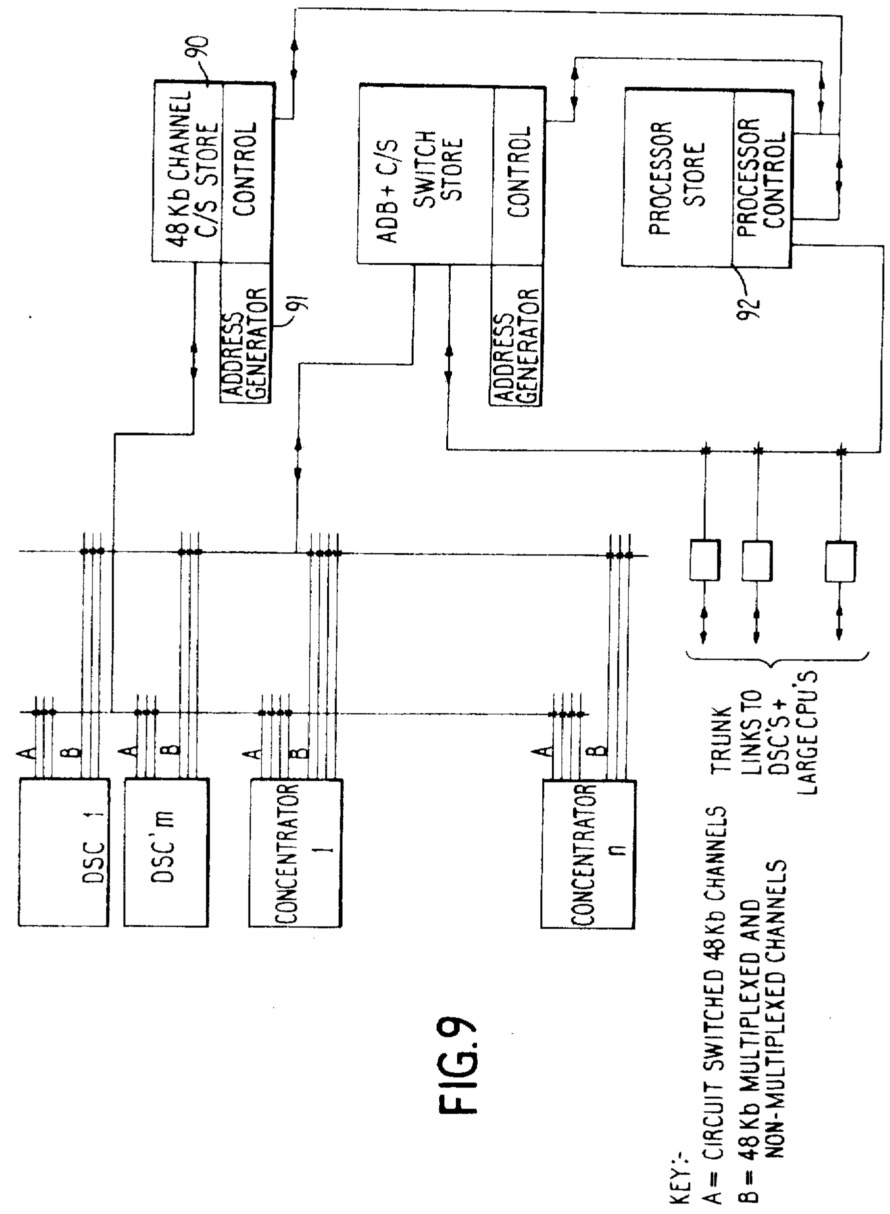
FIG. 9 illustrates the expansion of the basic system providing greater high bit rate circuit switched throughput.

A method for providing a higher throughput is outlined with reference to switching 48 Kb/s channels. It is arranged for a group of the 48 Kb/s channels from each concentrator or direct form subscriber to terminals to be used for circuit switched traffic only. These channels are associated with a separate switch store organized to function mainly in the circuit switch mode only. A block schematic of the system is given in FIG. 9.

The 48 Kb/s channel circuit switch store 90 has a separate address generator and control unit 91. The store contains a signalling queue for communicating to the common processor 92. Storage is also provided for assembling the destination address.

Store operations in this case are those associated with circuit switching which requires two cycles per input/output channel. It can be arranged therefore for the store throughput to be nearly twice that established previously. That is, a 650 nsec store can service approximately 160 × 48 Kb/s channels. In addition, due to the relatively small size of the store, a shorter store cycle time can be considered. It is reasonable to assume a cycle time of 300 nsecs which corresponds to approximately 320 × 48 Kb/s channels or greater.

The principle can be extended whereby groups of 48 Kb/s channels multiplexed to give 12 Kb/s channels are associated either with a separate 12 Kb/s channel circuit switch store, or shared with the 48 Kb/s store using an addressing procedure analogous to the addressed data block and circuit switched case. Similarly the other channel rates can be segregated.

The corresponding switch store throughputs for the separate 12 Kb/s are:

a. 650 nsecs cycle time : approximately 640 × 12 Kb/s channels b. 300 nsecs cycle time : approximately 1,280 × 12 Kb/s channels The concentrator is the first point in the network when alternate routing can be organized without the need for duplicating dedicated channels.

Figure 10:
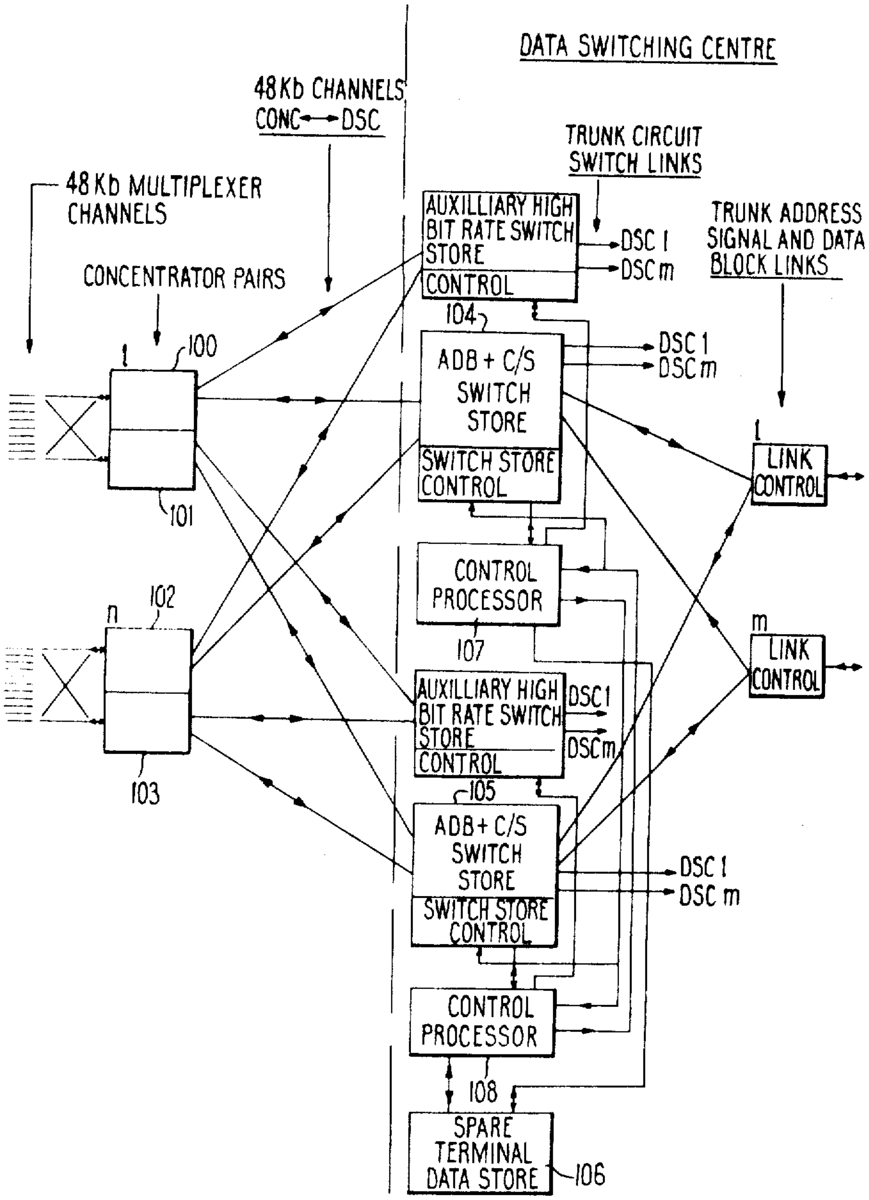
FIG. 10 is a block diagram of a system providing alternate routing for multiplexer channels under fault conditions.

One arrangement which provides to a large extent protection against failure in a concentrator, in the transmission path between concentrator and DSC, and in associated parts in the DSC, is given in block schematic form in FIG. 10.

All the multiplexed channels can oe served by each of a pair of concentrator units, 100/101 and 102/103 but under normal conditions nominally half of the terminals are serviced by each, and by the corresponding switch stores 104, 105. Under fault conditions in which the fault is in the concentrator, transmission, or in the DSC, the whole traffic is handled by the other concentrator and switch store complex. The grade of service under such conditions is clearly downgraded.

Additional storage 106 is required to hold terminal data tables in the event of store failure. Such storage is accessible by both processors 107, 108 and its contents derived from some mass store.

Connections between terminals on the same concentrator pair would be organized via a single switch store. Such connections would require interchange of data between the two switch store and processor complexes. Communication could be initiated via a queue of requests in each complex and by providing a facility for each processor to access all switch stores.

The condition of each processor and associated complex can be assessed by checks initiated by the other.

The same principles apply if the concentrators are local, that is within the DSC, forming effectively a first stage of switching.

It is to be understood that the foregoing description of specific examples of this invention is made by way of example only and is not to be considered as a limitation on its scope.

We claim:

1. A switching center for a synchronous digital data network including terminal equipments for a plurality of pairs incoming and outgoing data transmission means respectively, a first storage device having for each terminal equipment a dedicated storage location, a second storage device having storage locations dynamically allocated for the receipt of address characters from an incoming transmission means whereby an address of an outgoing transmission means can be assembled to enable transfer of data characters from an incoming transmission means to a storage location in the first transmission means associated with the addressed outgoing transmission means, each dedicated storage location being divided into at least two portions one of which is used to store an address of a different storage location in which an incoming data character from an incoming terminal equipment is to be stored, the other portion being used to store a data character received from an incoming terminal equipment to which a different storage location is dedicated, and means for sequentially and cyclically connecting the terminal equipments with the first storage device whereby an incoming character may be inserted in the storage location specified by the address held in the location dedicated to the incoming terminal equipment via which the character is received and a character already held in a storage location may be extracted from that location and transferred to an outgoing terminal equipment to which the storage location holding that character is dedicated, said incoming and outgoing terminal equipments being associated with one pair of incoming and outgoing transmission means.

2. A center according to claim 1 in which each dedicated storage location includes a third portion which is used to store functional information specifying a mode of utilization of the contents of that location whereby the address is used to indicate either another dedicated storage location in the first storage device for storage of an incoming data character or a dynamically allocated storage location in the second storage device for the receipt of an address character.

3. A center according to claim 2 in which the functional information alternatively specifies a mode of utilization of the contents of the location whereby the address is used to indicate a different storage location from which character is to be extracted for transfer via the terminal equipment to which the location containing the functional information is dedicated.

4. A center according to claim 1, in which each dedicated storage location includes a portion which is used to store signalling supervision information, the center including signal character checking means and a third storage device wherein signal characters received from terminal equipments may be stored, the supervisory information controlling the checking of incoming signal characters and subsequent transfer to the third storage device of a checked signal character together with the address of the storage location dedicated to the terminal equipment from which the signal character is received.

5. A center according to claim 4 in which each dedicated storage location includes a portion which is used to store timing information for determining whether predetermined operations as defined by the functional information have occurred within specified time periods.

6. A center according to claim 2 including a fourth storage device having a plurality of dynamically allocatable storage locations for the receipt from and transfer to incoming or outgoing terminal equipments respectively of blocks of characters, and means for inserting into said third storage device blocks of characters received from an incoming terminal and means for transferring blocks of characters from said third storage device to outgoing terminals equipments specified by address information contained within the blocks.

7. A center according to claim 6 in which the functional information contained in a dedicated storage location in the first storage device specifies a mode of operation in which the address portion of the location is used to indicate a dynamically allocated storage location in the fourth storage device into which a sequence of characters received from the terminal equipment to which the dedicated storage location is dedicated is inserted for assembly into a block of characters.

8. A center according to claim 6 in which the functional information contained in a dedicated storage location in the first storage device specifies a mode of operation in which the address portion of the location is used to indicate a dynamically allocated storage location in the fourth storage device containing a block of characters from which characters are extracted in a predetermined sequence for emission via the terminal equipment to which the dedicated storage location is dedicated.

9. A center according to claim 7 in which a dedicated storage location includes a portion which is used to store information specifying the number of characters in the block being output from the dynamically allocated storage location.

10. A center according to claim 9 in which the portion containing the information specifying the number of characters is substituted for the portion which, in a circuit switched mode, is used to store a data character.

11. A center according to claim 1 in which the first storage device is divided into separate groups of dedicated storage locations one of which is associated solely with those incoming and outgoing transmission means operating at a single character transmission rate being the highest such rate in an otherwise multiple mixed multiplexed transmission structure.

* * * * *